United States Patent
Van Haaren et al.

(10) Patent No.: US 10,808,384 B2
(45) Date of Patent: Oct. 20, 2020

(54) WELL MANAGEMENT SYSTEM

(71) Applicant: AMTROL LICENSING INC., West Warwick, RI (US)

(72) Inventors: Christopher A. Van Haaren, Warwick, RI (US); Michael Cogliati, Warwick, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 74 days.

(21) Appl. No.: 16/046,441

(22) Filed: Jul. 26, 2018

(65) Prior Publication Data
US 2020/0032492 A1    Jan. 30, 2020

(51) Int. Cl.
*E03B 1/04*      (2006.01)
*G05B 15/02*      (2006.01)
*H04L 29/08*      (2006.01)

(52) U.S. Cl.
CPC ............ *E03B 1/04* (2013.01); *G05B 15/02* (2013.01); *H04L 67/125* (2013.01)

(58) Field of Classification Search
CPC ........................................................ E03B 1/04
USPC ................................................................ 166/53
See application file for complete search history.

(56) References Cited

U.S. PATENT DOCUMENTS

| | | | |
|---|---|---|---|
| 2011/0008816 A1* | 1/2011 | Ball | G01N 33/56972 435/29 |
| 2012/0004778 A1* | 1/2012 | Lai | E03B 7/045 700/282 |
| 2015/0047501 A1* | 2/2015 | Vines | F04B 53/06 95/19 |
| 2016/0200608 A1* | 7/2016 | Tharp | C02F 3/12 210/620 |
| 2016/0342161 A1 | 11/2016 | Allen et al. | |
| 2016/0378076 A1 | 12/2016 | Hill et al. | |

FOREIGN PATENT DOCUMENTS

| | | |
|---|---|---|
| KR | 100689108 | 2/2007 |
| WO | 0161429 | 8/2001 |

OTHER PUBLICATIONS

Intl. Search Report and Written Opinion of the Intl. Searching Authority; PCT/US2019/043594; dated Oct. 18, 2019.
Catherine Kavanaugh, Plastics News Staff; Phyn JV ready to make splash with smart water device; Plastics News, Mar. 5, 2018; 1 page.

* cited by examiner

*Primary Examiner* — Taras P Bemko
(74) *Attorney, Agent, or Firm* — Tucker Ellis LLP; Carlos Garritano; Evan T. Perry

(57) ABSTRACT

A well management system provides Internet-enabled monitoring, configuration, and control of a well system that may include a pump and a pressure tank. A controller is operatively coupled to the pump. The controller controls the pump based on pressure readings from a pressure sensor to maintain a configured pressure range within the system. The controller can communicate with a management system via a communications network. The management system is further in communication with one or more client devices, which may be associated with a homeowner, a service provider, a manufacturer, or the like. Via the management system, the client devices can receive information from the controller and send commands to the controller.

15 Claims, 11 Drawing Sheets

WELL MANAGEMENT SYSTEM

TECHNICAL FIELD

This application relates generally to well systems and, more particularly, to an Internet-enabled well management system.

BACKGROUND

A well system generally includes a water pump that draws water from a well to a plumbing system of a structure. A pressure tank is often utilized to provide water under pressure to the plumbing system to supplement the water pump and also to allow the water pump to run intermittently. Even when the pump is capable of meeting demand, a continuously running pump may have a shorter operational lifetime.

A pressure switch enables the well pump to operate intermittently while also ensuring that the system maintains pressure. The pressure switch is a device that opens and closes an electrical contact based on a water pressure acting against an input of the pressure switch. The pressure switch is configured to close the electrical contact, and therefore activate the pump, when the pressure acting against the input falls to a predetermined cut-in pressure. Similarly, the pressure switch is configured to open the electrical contact (i.e. turn off the pump) when the pressure acting against the input rises to a predetermined cut-out pressure.

A pressure switch merely maintains a system pressure within a configured range and does not provide any pump protection. In addition, physical inspection of the well system (i.e. the pressure tank and/or pump) is required in order to ascertain a status and/or make system adjustments.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a well management system provides Internet-enabled monitoring, configuration, and control of a well system that may include a pump and a pressure tank. A controller is operatively coupled to the pump that moves a fluid from a source to a distribution system. The controller can incorporate or be communicatively coupled to a pressure sensor that measures a fluid pressure of the system. The controller controls the pump based on pressure readings from the sensor to maintain a configured pressure range within the system.

The controller can communicate with a management system via a communications network. The management system is further in communication with one or more client devices, which may be associated with a homeowner, a service provider, a manufacturer, or the like. Via the management system, the client devices can receive information from the controller and send commands to the controller.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

General Overview

Figure 1:
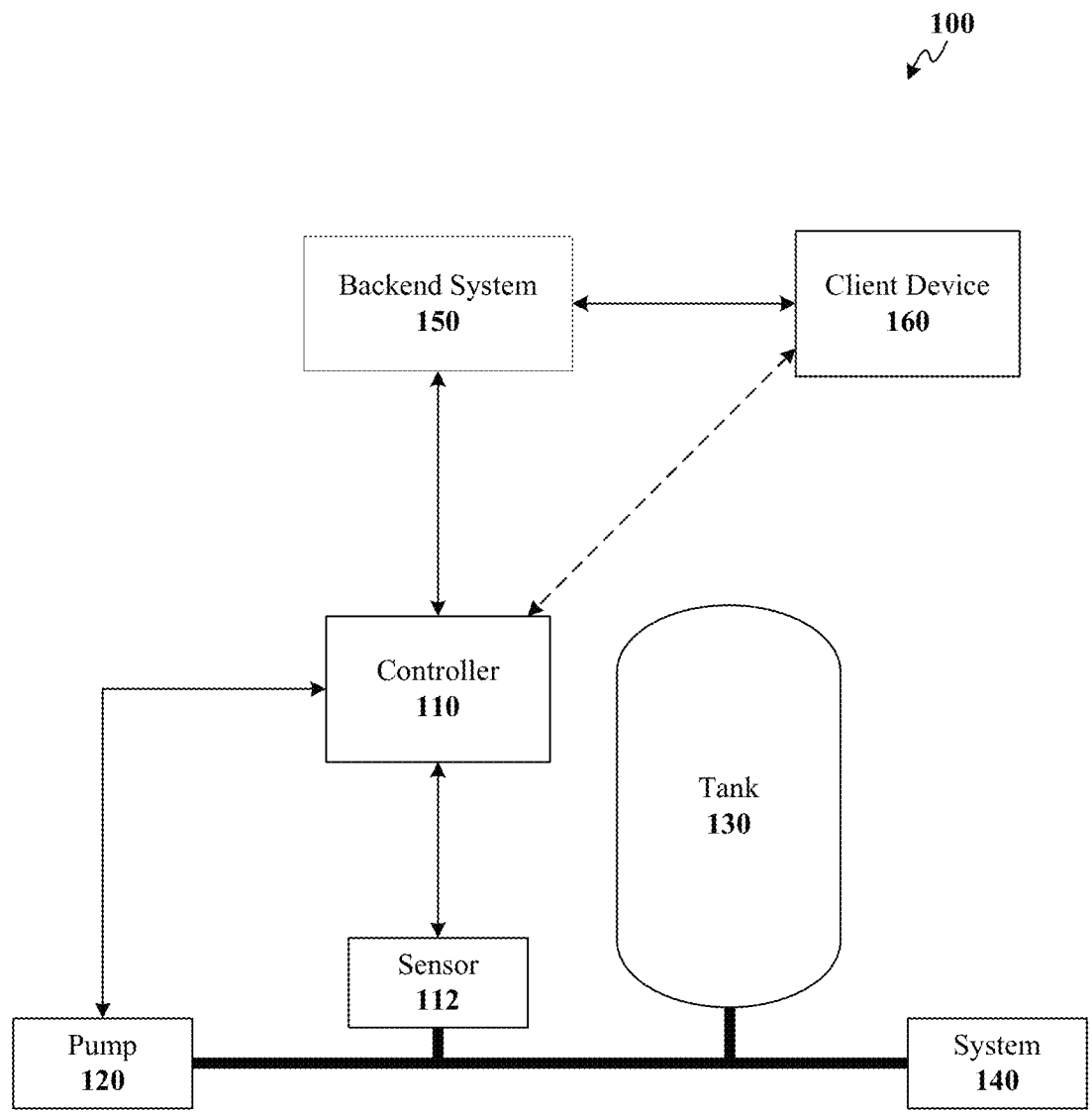
FIG. 1 is a schematic block diagram of an exemplary, non-limiting embodiment of a well management system according to one or more aspects.

As discussed in the background, pressure switches are often employed to control operation of a well pump. Such devices do not provide robust management, control, or protection of the well system. In addition, pressure switches require physical access to be adjusted.

In various, non-limiting embodiments, a system and associated methods are provided for well system management. For a well system that includes a well pump and a pressure tank, a controller is provided that is capable of controlling pump operation while also providing enhanced features beyond the capabilities of a pressure switch. The controller can be a processor-based device capable of having a configurable pressure setpoint, providing pump and/or system protection, supporting and performing system diagnostics, recording operational information related to the system, enabling energy saving options, issuing alerts and notifications, etc. Still further, the controller can include a communications interface that enables communications via a network with various remote devices or systems. Accordingly, the well system can be monitored and managed off-site.

In accordance with an aspect, the controller communicates with a backend system. The backend system, in turn, communicates with one or more client devices that may be associated with homeowners, service contractors, manufacturers, etc. The controller and the backend system can create an association between a homeowner (i.e. the owner of the well system) and a service contractor (i.e. a service professional that performs maintenance on the well system).

According to an aspect, the association is fully controlled by the homeowner. For instance, a specific service contractor can be selected by the homeowner and associated with the controller (i.e. the homeowner's controller). The service contractor can thereafter access information communicated by the controller to the backend system. Such information may include alerts or notifications issued by the controller. The level of access available to the service contractor is configurable by the homeowner.

To facilitate remote management and control of the well system, the client devices may be provided with software applications configured to enable communication between the client devices and the backend system and/or the controller. Complete control of the well system can occur via the software application installed on the client devices. For example, via the software application, the pressure setpoints can be configured, system operational data can be viewed, diagnostic data can be acquired, alerts or notifications can be viewed, and/or an operating mode of the well system can be set. A service contractor associated with the well system can also view this information and control the well system via the software application subject to the access permissions established by the homeowner.

According to additional aspects, the controller provides full system control and protection. For instance, the controller can be placed into one of several operating modes beyond a normal operating mode in which the pump is activated and deactivated in accordance with configured cut-in and cut-out pressure levels, respectively. In a vacation mode, the controller can shut off the pump until the homeowner returns. In a storm mode, the controller temporarily overrides a pressure setpoint to correspond to a maximum acceptable pressure for the pressure tank (e.g., for the diaphragm of the pressure tank). In this mode, the controller operates the well system with a tight differential to keep as much water as possible in the pressure tank in case of a power outage. In a maintenance mode, a homeowner or a service contractor is provided with information to understand an operating status of the well system and to diagnose problems. For instance, the maintenance mode may enable a charge of the pressure tank to be measured and compared with initial readings in order to diagnose degradation. The controller may also enter a protection mode, autonomously or by user command, in which the controller operates to protect system components. For example, if the controller detects an anomalous current supply to the pump, the controller can shut of the pump. In another example, the controller can detect a negligible pressure change even when the pump is running and shut off the system.

In accordance with one embodiment, a controller for a well system is provided. The controller can include a processor; a component interface for operatively coupling the processor to one or more components of the well system, the one or more components including at least a well pump; a communication interface for enabling communication with at least one of a management system or a client device via a communication network; and a computer-readable storage medium storing an operational configuration, operational data, and computer-executable instructions. The instructions, when executed by the processor, configure the processor to: collect the operational data related to the one or more components of the well system via the component interface; control operation of the well pump in accordance with the operational data and the operational configuration; transmit the operational data to at least one of the management system or the client device via the communication interface; and receive a configuration update, via the communication interface, from the at least one of the management system or the client device and update the operational configuration based on the configuration update.

According to various examples, the controller can include a housing that contains the processor, the communication interface, the computer-readable storage medium, and the component interface. The housing can contain a pressure sensor. In addition, the housing is configure for installation on a well pressure tank.

According to another example, the controller can include a pressure sensor configure to provide a pressure reading of a fluid pressure within the well system. In this example, the operational configuration includes pressure parameters specifying a cut-in pressure and a cut-off pressure. The processor can be further configured to activate the well pump when the pressure sensor indicates the cut-in pressure and deactivates the well pump when the indicates the cut-off pressure.

In another example, the operational configuration can include an alarm condition. The processor can be further configured to transmit an alarm message to at least one of the management system or the client device when the operational data satisfies the alarm condition. In yet another example, the operational data includes electrical properties of the well pump in operation, condition of electrical supply to the well pump, cycles times of the well pump, and pressure data from the pressure sensor. The processor can be further configured to analyze the operational data to identify an issue with the well system; and deviate from the operational configuration in response to identification of the issue.

In one example, the one or more components coupled via the component interface can include a sensor configured to detect a water volume within a well pressure tank. The processor can be further configured to include the water volume in the operational data for transmission to at least one of the management system or the client device.

In another example, the operational configuration corresponds to one of a plurality of operational modes. The plurality of operational modes cab include an initial startup mode. During the initial startup mode, the processor is configured to: activate the well pump to fill a well pressure tank; determine a pre-charge of the well pressure tank based on pressure readings from a pressure tank; and establish values for a cut-in pressure and a cut-off pressure based on the pre-charge. The plurality of operational modes cab include a setup mode. During the setup mode, the processor is configured to configure the communication interface for communication with the at least one of the client device or management system via the communication network. The plurality of operational modes can include a vacation mode. During the vacation mode, the processor is configured to prevent operation of the well pump. The plurality of operational modes can include a storm mode. During the storm mode, the processor is configured to adjust a cut-in pressure and a cut-off pressure for the well pump to maintain a maximum volume in a well pressure tank. The plurality of operational modes can include a maintenance mode. During the maintenance mode, the processor is configured to prevent operation of the well pump and to determine a pre-charge of a well pressure tank.

In another embodiment, a computer-readable medium having stored thereon computer-executable instructions for a well system control application. The computer-executable instructions, when executed by a processor, configure the processor to: receive well system information from at least one of a management system or a controller, wherein the well system information relates to a well system having the controller; output a user interface that enables display of the well system information and navigation through portions of the well system information; receive user input, via the user interface, indicative of a request for a change to a portion of the well system information; transmit a message to the at least one of the management system or the controller to effectuate the change requested; and update the user interface to reflect the change to the portion of the well system information.

According to an example, the request for the change to the portion of the well system information represents a change to an operational mode of the controller. In another example, the computer-readable medium further stores instructions that configure the processor to receive an alert notification from the at least one of the management system or the controller, and display the alert notification to inform a user of an alert condition with the well system. The user can a service professional selected to maintain the well system and provided access to the well system in accordance with a system access level established by a homeowner.

In yet another embodiment, a system is provided. The system includes a tank configured to store a fluid and deliver the fluid under pressure to a distribution system. The system further includes a controller configured to control operation of a pump to supply the fluid to one of the tank or the distribution system. The controller is operatively coupled to the pump and a pressure sensor that provides a pressure reading for the system. The controller is configured to control operation of the well pump in accordance with an active operational mode and based on the pressure reading and pump operational data. The system can further include a management system communicatively coupled to the controller via a communication network. The management system is configured to receive system information from the controller and store the system information in association with an identifier corresponding to the controller. In addition, the system can include a client device communicatively coupled to the management system and storing computer-executable instructions for a control application. The control application configures the client device to receive system information from the management system, display system information to a user, and transmit control commands to the controller via the management system.

An overview of some embodiments of a well management system has been presented above. As a roadmap for what follows next, the management system is generally described in more detail followed by an exemplary specific implementation. Afterwards, an exemplary computing/network environment, in which such embodiments and/or features described above can be implemented, are described. The above noted features and embodiments will be described with reference to the drawings, wherein like reference numerals are used to refer to like elements throughout.

Well Management System

As mentioned above, in various embodiments, an improved well management system can include a controller capable of communicating with a backend system via a communication network and, through the backend system, communicate with one or more client devices.

FIG. 1 shows a schematic block diagram of an exemplary, non-limiting embodiment of an Internet-enabled well management system. System 100 can include a controller 110, which is operatively coupled to a pump 120 for moving a fluid from a well. The pump 120 provides the fluid to a pressure tank 130 and/or a distribution system 140 (e.g., a plumbing system of a structure). The tank 130 can be a pressure vessel having an internal diaphragm that separates an interior volume into an air chamber from a water chamber. The air chamber is provided with a pre-charge of air pressure so as to provide fluid under pressure to the distribution system 140 even when pump 120 is not running.

Controller 110 activates and deactivates pump 120 in accordance with an operating mode established for the system 100. More particularly, the controller 110 collects operational data related to various components of system 100 and operates pump 120 in accordance with the operational data and an operational configuration stored by the controller 110.

By way of example, the operational configuration can include pressure setpoints and the operational data can include pressure readings from a sensor 112. The sensor 112 can be coupled to fluid lines between pump 120 and tank 130 or distribution system 140. The sensor 112 provides a pressure reading in the fluid lines and communicates the pressure reading to controller 110. In accordance with a normal operating mode, controller 110 activates pump 120 when the pressure reading falls below a cut-in pressure and deactivates pump 120 when the pressure reading is at or above a cut-out pressure. Although depicted as being separate from controller 110, it is to be appreciated that sensor 112 can be integrated with controller 110. For instance, sensor 112 can be at least partially integrated with a circuit board of controller 110 and/or enclosed within a common housing. Moreover, the common housing that includes the controller 110 and/or sensor 112 may be installed on or attached to the tank 130.

Controller 110 can acquire operational data related to the pump 120. For instance, electrical properties (e.g., current, voltage, resistance) of pump 120 as well as cycle times can be recorded by the controller 110. Additional operational data can include a water level within tank 130, system output history, and/or data from other sensors (e.g., water usage sensors, temperature sensors, etc.). In addition, operational data can also include user input such as, but not limited to, images of a physical setup of system 100, maintenance notes, etc.

The operational configuration of controller 110 can include alarm conditions or event triggers. The controller 110 can respond with a pre-configured action when operational data acquired by controller 110 satisfies an alarm condition or event trigger. For instance, the controller 110 may deviate from a normal operating mode in response to the alarm condition or event trigger. The deviation can include shutting off the pump for a period of time and/or until the condition is resolved.

The controller 110 can also transmit a notification or alert message to inform a homeowner or service contractor of the system condition. To enable this action, controller 110 can be configured to communicate with a backend system 150 and/or a client device 160. The communication can be performed via a communications network or, in some instances, the communication can be a direct device-to-device communication.

According to an aspect, the backend system 150 can register one or more users with the controller 110. These users may utilize client devices 160 to communicate with controller 110 via the backend system 150 subject to configured access levels. For instance, a homeowner may have full access to all information. The homeowner can specify a service contractor and register the service contractor with the backend system 150. The level of information access granted to the service contractor is adjustably controlled by the homeowner.

The controller 110 can be polled for information by the backend system 150. Alternatively, the controller 110 can be configured to transmit information periodically. In one embodiment, the backend system 150 may operate as a relay between controller 110 and client device 160. For instance, the backend system 150 may forward information, transmitted by the controller 110, to the client device 160 and may forward commands and requests from the client device 160 to the controller 110. In another embodiment, operational data and other operational history information can be transmitted by the controller 110 to the backend system 150 for storage. The backend system 150 can provide, subject to access levels, the stored information to client device 160 independently of controller 110. It is to be appreciated that system 100 can operate along a continuum between the two approaches described above. For example, the controller 110 can retain certain information while the backend system 150 stores other information to allow efficient utilization of storage on controller 110.

In another aspect, controller 110 can utilize direct device-to-device communication. For instance, client device 160 may be in proximity (i.e. same structure, same room, etc.) as controller 110. In such cases, a wired or wireless connection (e.g. Bluetooth, wireless USB, ad-hoc WiFi, etc.) can be established between client device 160 and controller 110.

The operational configuration of controller 110 can specify one of a plurality of operating modes or states in which the controller 110 currently operates. As mentioned previously, the controller 110 utilizes pressure setpoints and a pressure reading to activate/deactivate pump 120 in a normal operating mode. When controller 110 is powered on for a first time, it may enter an initial startup mode. In the initial startup mode, the controller 110 can active pump 120 to fill tank 130, determine a pre-charge of the tank 130, and establish pressure settings based on the pre-charge. Those pressure settings can be subsequently be utilized in the normal operating mode.

Additional modes may include a setup mode, a vacation mode, a storm mode, and a maintenance mode. In the setup mode, the controller 110 may utilize direct device-to-device communication initially with client device 160 in order to register with and configure communications with backend system 150. In the vacation mode, the controller 110 is configured to prevent activation of pump 120. In the storm mode, the controller 110 overrides the pressure setpoints in order to maximize an amount of water stored in the tank 130. In maintenance mode, the controller 110 can recheck a charge of tank 130. This value can be compared with an initial reading to determine charge degradation. In this manner, maintenance mode provides a health status check of system 100. Further, maintenance view on client device 160 can provide health status information such as, but not limited to, the charge degradation, a current pre-charge reading, electrical inputs to pump 120, etc. Moreover, a protection mode is available for when controller 110 detects an alarm condition or other event that justifies deviation from the normal operating mode.

Figure 2:
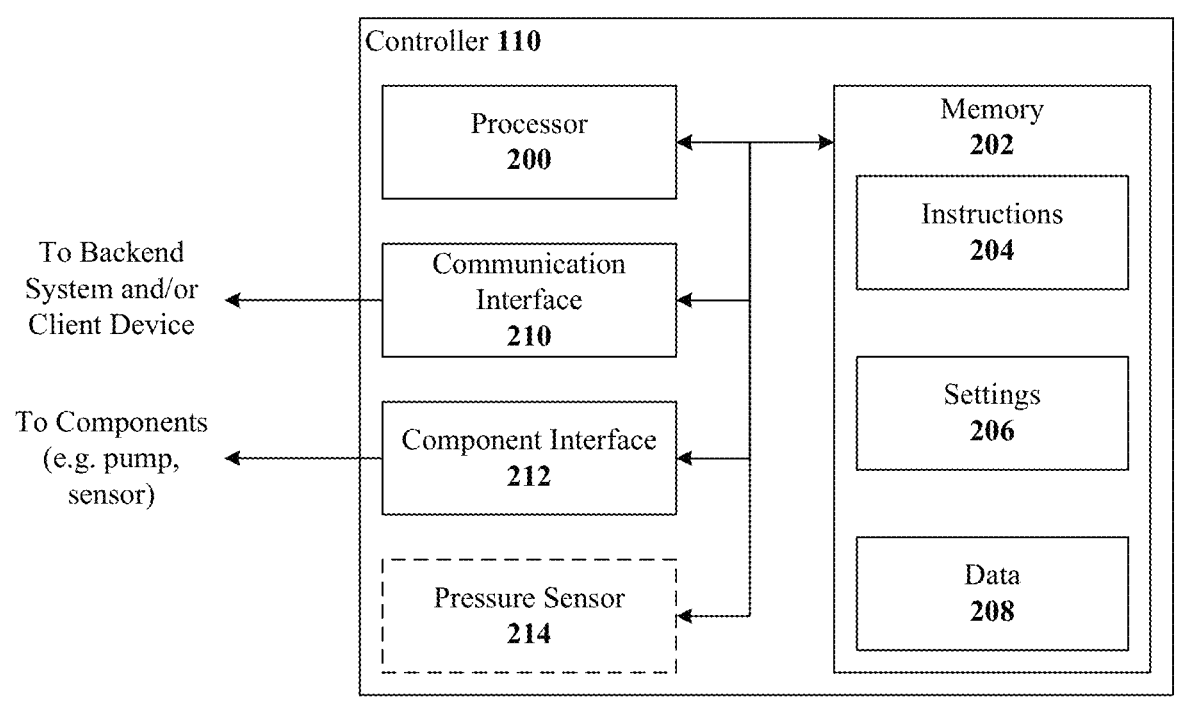
FIG. 2 is a schematic block diagram of an exemplary, non-limiting embodiment of a controller of the well management system of FIG. 1.

Turning to FIG. 2, illustrated is a schematic block diagram of an exemplary, non-limiting embodiment for a controller 110. As shown in FIG. 2, controller 110 includes one or more processor(s) 200 configured to executed computer-executable instructions 204 such as instructions composing a control and communication process for a well system. Such computer-executable instructions can be stored on one or more computer-readable media including non-transitory, computer-readable storage media such as memory 202. For instance, memory 202 can include non-volatile storage to persistently store instructions 204, settings 206 (e.g. configuration settings, parameter settings, pressure setpoints, etc.), and/or data 208 (e.g., operational data, history data, water usage data, system health data, pressure data, current data, voltage, data, resistance data, user-stored data, etc.). Memory 202 can also include volatile storage that stores instructions 204, other data (working data or variables), or portions thereof during execution by processor 200.

Controller 110 includes a communication interface 210 to couple controller 110, via the Internet or other communications network, to various remote systems such as, but not limited to, backend systems, client devices, other controllers, or Internet-enabled devices (e.g., IoT sensors). Communication interface 210 can be a wired or wireless interface including, but not limited, a WiFi interface, an Ethernet interface, a Bluetooth interface, a fiber optic interface, a cellular radio interface, a satellite interface, etc. The communications interface 210 can be configured to communicate with client devices and/or backend systems through a local area network co-located with the well system (e.g. a home network) as described above. The communications settings, thus established, can be stored in memory 202.

A component interface 212 is also provided to couple controller 110 to various components of well system 100. For instance, component interface 212 can connect controller 110 to sensors (such as pressure sensor 112, water level sensors, flow sensors, etc.), well pump 120, input/output devices (e.g., buttons, indicators, LEDs, displays, etc.) Via the component interface 212, the controller 110 can activate pump 120 (i.e. close an electrical switch), deactivate pump 120 (i.e. open the switch), acquire electrical properties (i.e., current, voltage, resistance, etc.) of pump 120, acquire readings from sensors, activate LEDs, receive input from input devices, output display data, or the like. Accordingly, component interface 212 can include a plurality of electrical connections on a circuit board or internal bus of controller 110 that is further coupled to processor 200, memory 202, etc. Further, the component interface 212 can implement various wired or wireless interfaces such as, but not limited to, a USB interface, a serial interface, a WiFi interface, a short-range RF interface (Bluetooth), an infrared interface, a near-field communication (NFC) interface, etc.

As shown in FIG. 2, the controller 110 can include an integrated pressure sensor 214. Accordingly, the pressure sensor configured to provide a pressure reading of the well system can be included in a common housing with the other components of the controller 110 (i.e. processor 200, memory 204, etc.). However, it is to be appreciated that the pressure sensor may be a separate component coupled to controller 110 via the component interface 212 as shown in FIG. 1, for example.

Figure 3:
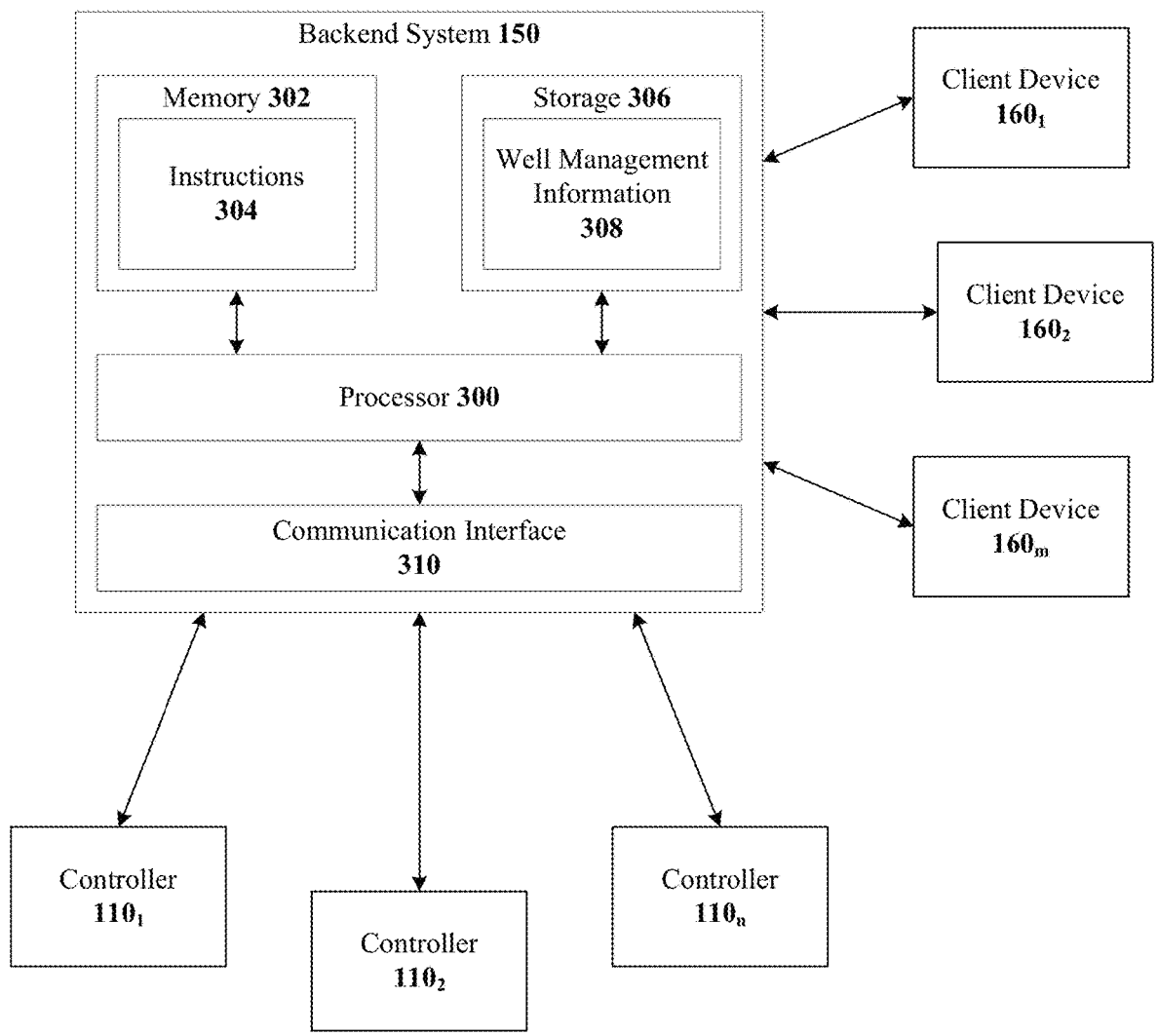
FIG. 3 is a schematic block diagram of an exemplary, non-limiting embodiment of a backend system of the well management system of FIG. 1.

Referring to FIG. 3, an exemplary, non-limiting embodiment of a backend system 150 is illustrated. As shown in FIG. 3, backend system 150 includes one or more processor(s) 300 configured to execute computer-executable instructions 304 such as instructions composing a server process to orchestrate well control and management between controllers of a well system and client devices associated with users. Such computer-executable instructions can be stored on one or more computer-readable media including non-transitory, computer-readable storage media such as memory 302 or storage 306. For instance, storage 306 can include non-volatile storage to persistently store instructions 304 and/or well management information 308 (e.g., operational data, history data, water usage data, system health data, pressure data, current data, voltage, data, resistance data, user-stored data, etc.) received from controller 110.

Memory 302 can also include volatile storage that stores instructions 304, other data (working data or variables), or portions thereof during execution by processor 300. The well management information 308 can be stored in association with users (e.g., homeowners, service contractors, manufacturers, etc.) and/or serial numbers or other identifiers of controllers 110. In addition, access permission information overlays well management information 306 and determines which users or devices can access information and/or control portions of connected well systems.

Backend system 150 further includes a communication interface 310 to couple backend system 150, via the Internet or other communications network, to controllers 110 and client devices 160. Communication interface 310 can be a wired or wireless interface including, but not limited, a WiFi interface, an Ethernet interface, a Bluetooth interface, a fiber optic interface, a cellular radio interface, a satellite interface, etc. As shown in FIG. 3, backend system 150 can service a plurality of controllers 110, which include controller $110_1$, controller $110_2$, ..., controller $110_n$, where n is an integer greater than or equal to one. The controllers 110 can be associated with different well systems owned by disparate homeowners. Similarly, a plurality of client devices $160_1$, $160_2$, ..., $160_m$ (where m is an integer greater than or equal to one) can communicate with backend system 150. Client devices 160 can be associated with various users such as homeowners, service contractors, manufacturers, etc.

Figure 4:
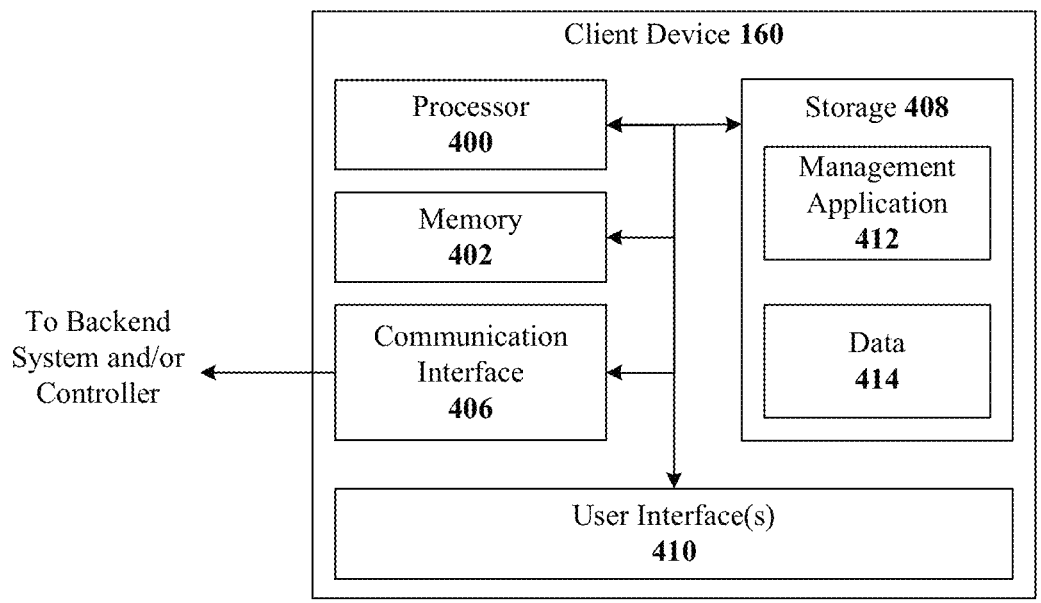
FIG. 4 is a schematic block diagram of an exemplary, non-limiting embodiment of a client device of the well management system of FIG. 1.

Turning now to FIG. 4, a schematic block diagram of an exemplary, non-limiting embodiment of a client device is illustrated. Client device 160 includes one or more processor(s) 400 configured to execute computer-executable instructions such as instructions composing a management application 412. Such computer-executable instructions can be stored on one or more computer-readable media including non-transitory, computer-readable storage media such as memory 402 or storage 408. For instance, storage 408 can include non-volatile storage to persistently store management application 412 and/or data 414 (e.g., operational data, history data, water usage data, system health data, pressure data, current data, voltage, data, resistance data, user-stored data, etc.) received from controller 110. Memory 402 can also include volatile storage that stores instructions, other data (working data or variables), or portions thereof during execution of management application 412 by processor 400.

Client device 160 further includes a communication interface 406 to couple client device 160, via the Internet or other communications network, to controllers 110 and backend system 150. Communication interface 406 can be a wired or wireless interface including, but not limited, a WiFi interface, an Ethernet interface, a Bluetooth interface, a fiber optic interface, a cellular radio interface, a satellite interface, etc. Client device 160 can further include a user interface 410 that comprises various elements to obtain user input and to convey user output. For instance, user interface 410 can comprise of a touch display which operates as both an input device and an output device. In addition, user interface 410 can also include various buttons, switches, keys, etc. by which a user can input information to client device 160; and other displays, LED indicators, etc. by which other information can be output to the user. Further still, user interface 410 can include input devices such as keyboards, pointing devices, and standalone displays.

In accordance with an embodiment, client device 160 is a computing device, which is readily carried by a user, such a smartphone or tablet device. However, it is to be appreciated that client device 160 can be other portable form-factors such as a laptop computer, a convertible laptop, a watch computing device, or the like. Moreover, client device 160 can be a desktop computer, or other larger, less portable computing device. That is, management application 412 can be installed and executed on substantially any computing device provided that such a computing device can communicate with backend system 150 and/or controller 110 as described herein.

The management application 412 configures the client device 160 to receive well system information from backend system 150 or controller 110. The management application 412 outputs a graphical user interface that enables a user to display the well system information. The management application 412 can obtain user input via the user interface 410 and in accordance with the graphical user interface. The user input can be indicative of a request to display a portion of the well system information and/or a request to change a portion of the well system information (i.e. change a setting or a mode). The management application 412 further configures the client device 160 to transmit the request, via the communication interface 406, to the backend system 150 or controller 110.

For example, with the management application 412, a user can view notification or system alerts, view a water level in the pressure tank, view diagnostic information (e.g., current readings, voltage readings, resistance readings) as plotted values for complete cycles or as instant values, view other system information (e.g., images, service notes, etc.). The user can also switch the mode of the well system to enable vacation mode, storm mode, maintenance mode, or the like. Usage information is also available via the management application 412. For instance, power utilization and water usage can be tracked by controller 110 and viewed with the management application 412. In general, total control of well system is available through the management application 412.

Figure 5:
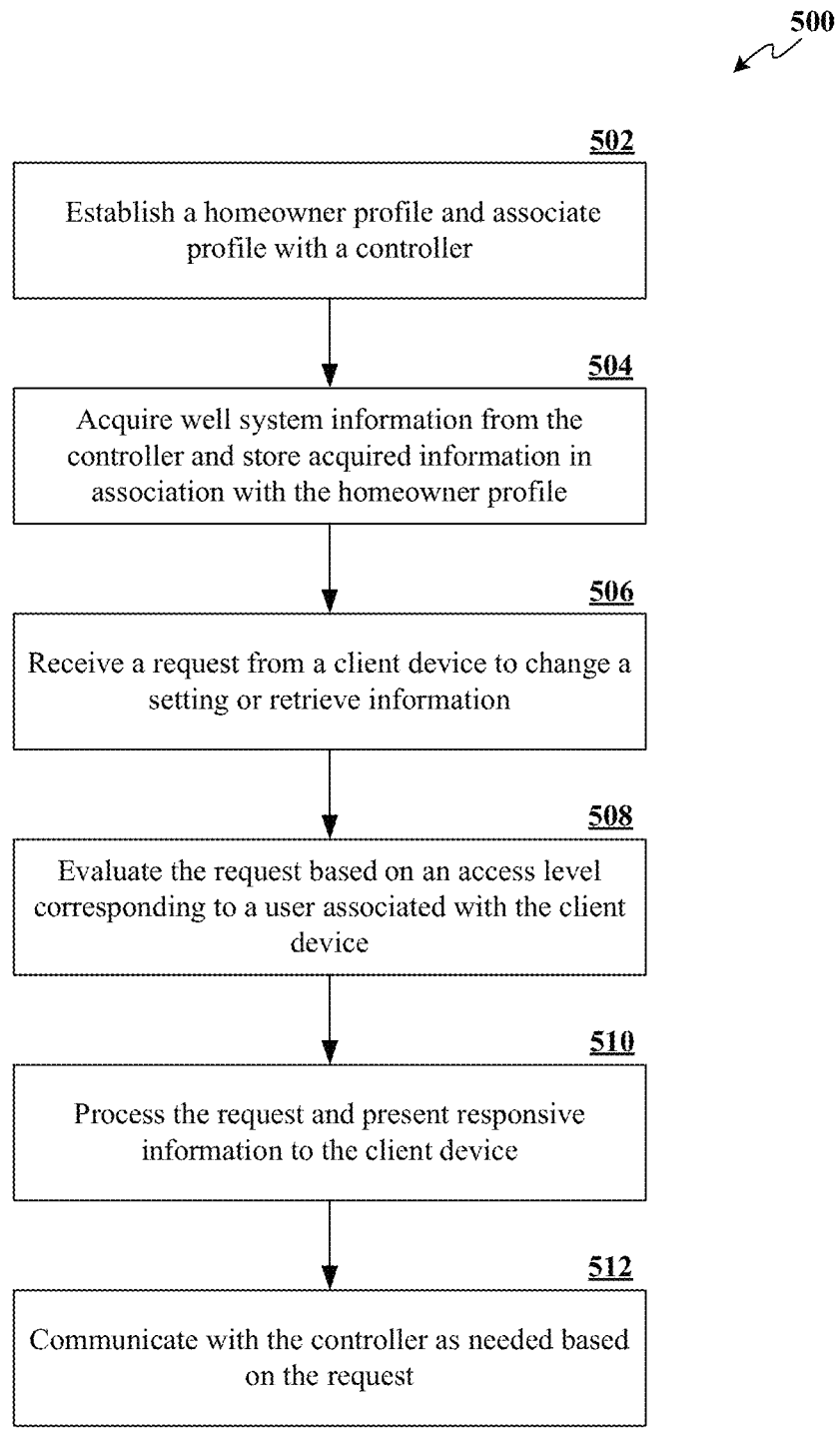
FIG. 5 is a flow diagram of an exemplary, non-limiting embodiment for facilitating communication between a controller and a client device in accordance with various aspects.

Referring now to FIG. 5, illustrated is a flow diagram of a method 500 for facilitating communication between a controller and a client device. Method 500 can be implemented, for example, by backend device 150 described above. At 502, an association between a homeowner profile and a controller is established. The link between a homeowner account and an identifier of the homeowner's controller enables the backend system to receive information from the controller and allow the homeowner to login via the management application on a client device to view information and control the well system. At 504, well system information is acquired from the controller and stored in association with the homeowner profile. Well system information can include status information, historical operating information, configuration settings, notifications, etc. At 506, a request is received from the management application of a client device to change a setting or retrieve information related to the controller. At 508, the request is evaluated based on an access level corresponding to a user associated with the client device. For example, the homeowner may have unfettered access to all information, but a service contractor is subject to constraints specified by the homeowner and may have limited access. At 510, the request is processed if access is granted and responsive information is transmitted to the client device. At 512, the backend system communicates with the controller as needed based on the request. For instance, the request may be a change to a setting or mode of the controller. Accordingly, the backend system communicates with the controller to effectuate the change. In another example, the request can relate to a portion of information that is not stored at the backend system. In such cases, the backend system communicates with the controller to retrieve the requested information.

Figure 6:
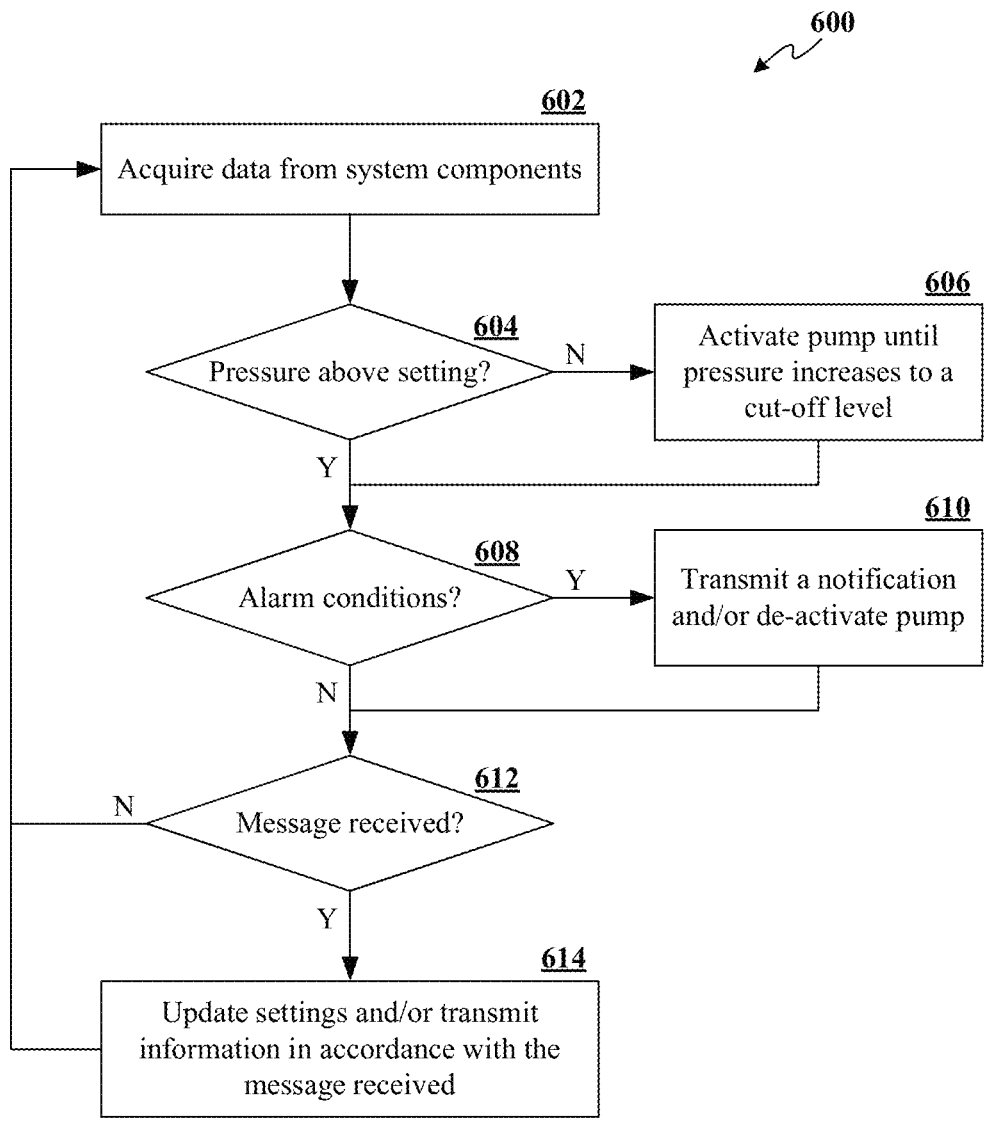
FIG. 6 is a flow diagram of an exemplary, non-limiting embodiment for controlling a well system in accordance with various aspects.

Turning now to FIG. 6, a flow diagram for an exemplary method 600 for controlling a well system is depicted. Method 600 can be implemented, for example, by controller 110. At 602, data is acquired from system components. For instance, data from a pressure sensor, sensors associated with a pressure tank, leak sensors, and from a well pump can be collected by the controller. At 604, a determination is made as to whether a pressure reading is above a setpoint—specifically, a cut-in pressure. If not, the controller activates the pump, at 606, and keeps the pump running until the pressure increase to a cut-off level. If, at 604, the pressure is above the setpoint, the controller evaluates the data acquired from system components to determine, at 608, if any alarm conditions are present. If an alarm condition exists, the controller transmits a notification to the backend system at 610. If no alarm condition exists, or after transmitting the notification, the controller determines at 612 if a message is received from the backend system. If no message is received, the controller can return to 602 to acquire new data from the system components and repeat method 600. However, if a message is received, the controller, at 614, can update settings and/or transmit information in accordance with the message received.

Figure 7:
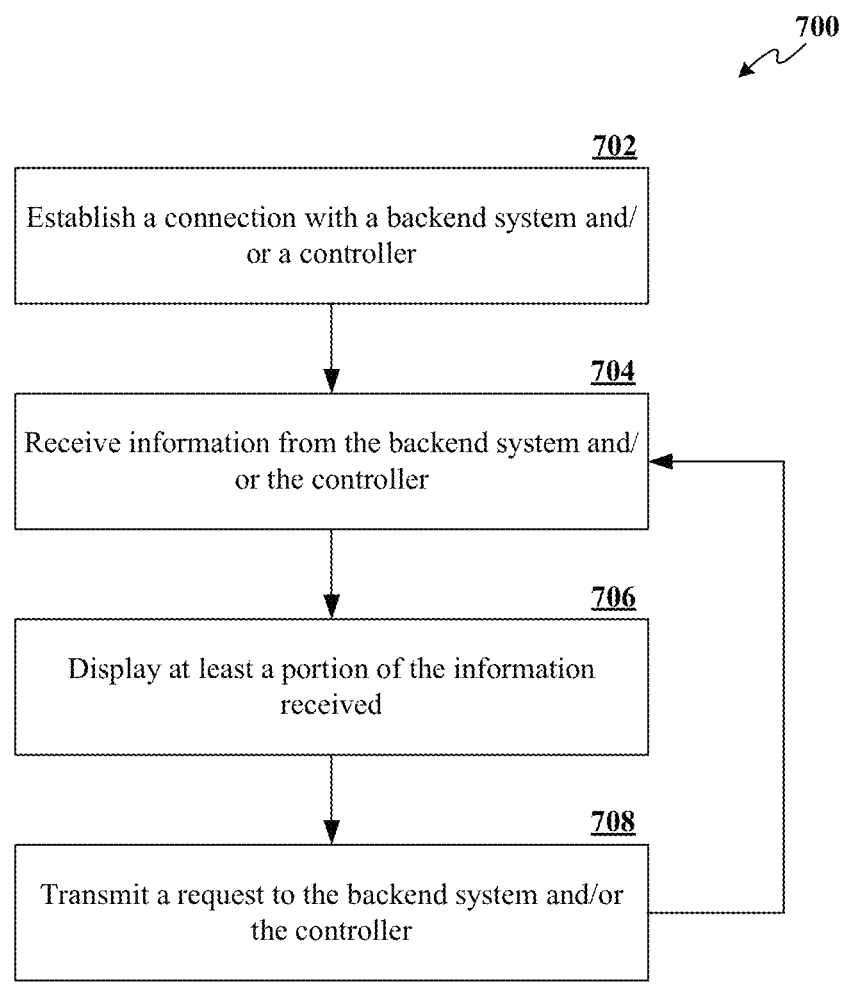
FIG. 7 is a flow diagram of an exemplary, non-limiting embodiment for managing a well system via client device according to one or more aspects.

In FIG. 7, a flow diagram of an exemplary method 700 for managing a well system via client device is illustrated. Method 700 can be implemented, for example, by client device 160 and/or management application 412. At 702, a connection is established between the client device (management or control application) and the backend system (or the controller). The connection may be via a communication network such as the Internet or via a direct device-to-device connection. At 704, information is received from the backend system or the controller. At 706, at least a portion of the information received is displayed on the client device. At 708, a request is transmitted to the backend system or the controller. The request can be based on user input received by the client device from a user. After transmitting the request, method 700 can return to step 704 and repeat.

Figure 8:
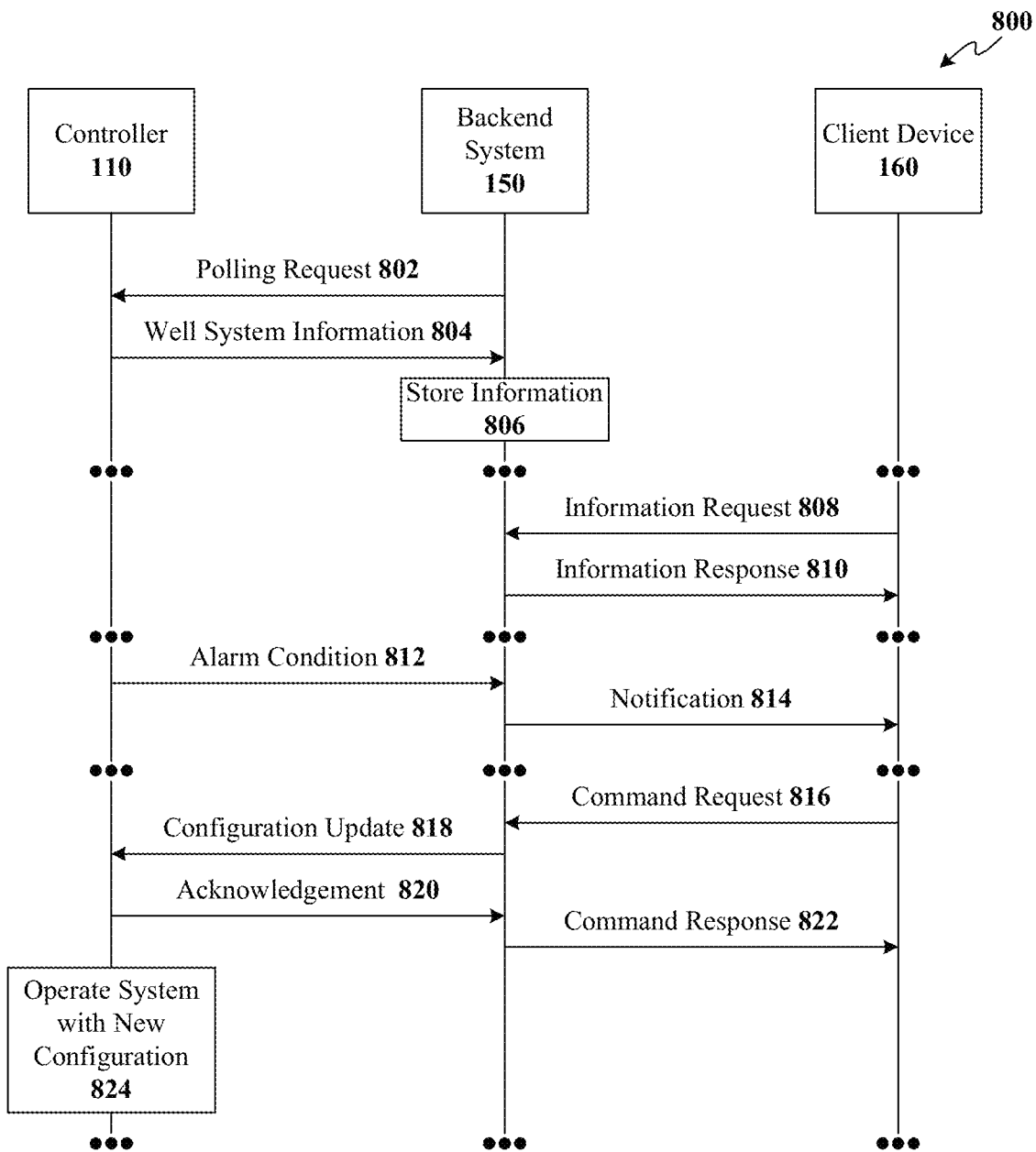
FIG. 8 is a communication diagram of exemplary, non-limiting communication sequences within the well management system of FIG. 1.

Turning to FIG. 8, an exemplary communication sequence diagram is illustrated that depicts communications between controller 110, backend system 150, and client device 160 of the well management system 100. As shown in FIG. 8, a first sequence can involve the backend system 150 sending a polling request 802 to controller 110. The polling request can initiate a data transmission of well system information 804 by the controller 110 to the backend system 150. Alternatively, the controller 110 can be configured to periodically transmit the well system information 804 without explicit polling. Backend system 150 stores the received information at 806.

In a second exemplary sequence, client device 160 sends an information request 808 to the backend system 150 and the backend system 150 sends an information response 810 to client device 160 in response to the request. In a third sequence, the controller 110 can detect an alarm condition and transmit a message 812 indicating the condition. The backend system 150 transmit a notification 814 to client device 160 that is associated with the controller 110 to alert a user of the alarm condition. In a fourth exemplary sequence, the backend system can receive a command request 816 from the client device 160. The command request 816 can indicate a change in mode or settings that alters a configuration of the controller 110. The backend system 150, in response to the command request 816, transmits a configuration update 818 to the controller 110.

The controller 110 may send an acknowledgment 820 to the backend system 150, which in turn may send a command response 822 to the client device 160. In response to the configuration update 818, the controller 110 can update stored configuration information or settings and, subsequently, operate the well system in accordance with the new configuration.

Exemplary Implementation

The following section provides a specific and detailed implementation of an exemplary, non-limiting well management system that was generally described above. It is to be appreciated that the following implementation is simply one possible implementation and is not intended to limit the subject claims.

A well system controller can be an electrical device that supports either an 115 or a 230 AC voltage as input. To control a well pump, the controller can interrupt both sides of power to the pump. The controller can include one or more LED indicators. One indicator (e.g., green) can illuminate when the controller has an active communication connection. Another indicator (e.g., red) can illuminate in response to an error. It is to be appreciated that a single multi-color LED can be utilized for both indicators. The controller can be configured to operate with a system fluid pressure ranging from approximately 10 PSI to 100 PSI. The controller can operate with a 1 horsepower or a 2 horsepower pump, depending on input voltage or other system requirements. The controller can include a WiFi adapter suitable for 802.11 a/b/g/n communications at 2.4 GHz, 5 GHz, or other operating frequency. The controller can include relays rated up to 30 amps. A terminal block interface for power and/or pump connections can be configured to accept up to 10 AWG solid or stranded wires.

A suitable pressure sensor can have a proof pressure of 125 PSIG and a burst pressure of 375 PSIG. Pressure accuracy may be maintained after 125 PSIG overpressure. The pressure sensor may have a linear response from 10 PSIG to 100 PSIG. According to one embodiment, the software can indicate a zero PSIG for anything system pressure below 10 PSIG. The pressure sensor can have a differential of +/-2% of a maximum pressure between 10-100 PSIG and an accuracy of +/-5% of the maximum pressure over temperature.

The controller outputs can include amperage (read during pump on cycle), ohms (read during pump on cycle), voltage (potential as sent to the pump), runtime (e.g., both cycle runtime and total runtime), and error codes.

An enclosure housing for the circuit board, sensor, etc., can include a pipe interface suitable for mounting to 0.25 inch female NPT.

The controller software can have various operational modes including, but not limited to a startup mode, a setup mode, a standard mode, a vacation mode, a storm mode, and a maintenance mode. A direct connection with the device is based on a serial number of the controller. In the startup mode, a pressure tank is filled to determine a pre-charge and the pressure settings are automatically set to +2 PSI and +22 PSI of the determined pre-charge. The controller software enables setup mode to be entered via a webpage or a software application downloaded to a client device. The client device allows a WiFi adapter to be configured to connect to the Internet through a home router, for example. The WiFi configuration can be cleared with a reset button on a control board. The reset button can also transition the controller into the initial startup mode to set up a pressure tank (new or replacement). In the standard mode, the pump is operated according to the set cut-in and cut-out pressures.

In the vacation mode, pump operation is prevented. An alert notification can be transmitted if system demand occurs (i.e. open tap) while in the vacation mode. The application on the client device can override and allow operation. In the storm mode, cut-in and cut-out pressures are adjusted to maintain a maximum acceptance volume based on a tank size. The controller can revert to standard mode after a period of time (e.g. 48 hours), after a power reset, or after an initial setup. In the maintenance mode, the pump can be made inoperable and the controller profiles a negative pressure slope to verify a pre-charge pressure of the tank after a faucet is opened.

The controller can provide pump cycle and pre-charge degradation monitoring. For instance, if pump run time is 50% shorter than observed during commissioning, a pre-charge degradation yellow alert can be issued. The controller can also monitored for rapid cycling or long demands. For instance, if the pump runs for 30 minutes (an adjustable value), a long demand alert can be transmitted and the pump is turned off. If a low pressure (e.g., less than 10 PSIG) is measured for 30 seconds, the pump can be disabled for 60 minutes and a low pressure alert can be sent.

The controller may also be configured for voltage monitoring. If an out of range voltage is detected for 60 seconds, the pump is disabled and a voltage alert is sent. The pump is re-enabled when the voltage falls in range again. The controller monitors pump run time by recording and reporting runtimes. An initial runtime reading can be provided for reference. The controller can timestamp all alerts and messages mentioned above.

The controller software can be remotely updated via the WiFi connection. A non-volatile memory can be included so that a power outage does not revert the controller to initial settings when restarted.

The controller software may be placed into startup mode for the initial commissioning of the well system. In startup mode, the controller software will automatically fill the well pressure tank to a preconfigured pressure setpoint. Upon draining the well pressure tank, the controller software will automatically calculate the well pressure tank pre-charge pressure. The cut-in and cut-out pressure setpoints will be calculated and automatically configured per the pre-charge pressure of the well pressure tank that was recorded during the initial commissioning of the well system. The cut-in and cut-out pressure setpoints will be set as 2 PSI above the pre-charge pressure and 22 PSI above pre-charge pressure, respectively. For example, a well pressure tank pre-charge pressure of 20 PSI would yield a cut-in pressure of 22 PSI and a cut-out pressure of 42 PSI. In startup mode, WiFi is not enabled. For this reason, all other controller modes, will be de-activated until the initial commissioning of the well system is complete and the controller software is no longer in startup mode.

After the initial commissioning of the well system is complete, the controller software may be placed into setup mode. Setup mode serves to connect the controller 110 to a local WiFi network as well as to program initial settings into the controller 110 memory 202. These settings will be retained and utilized for subsequent power-ups of the well system. Once a WiFi connection is established, the user will enter setup information such as home address, home email, contractor phone number, contractor email, well pump horsepower, well pressure tank model number, controller software password, etc. via the client device 160. The automatic cut-in and cut-out pressure setpoints established from the startup mode may be manually overridden to different pressure values by direct user input from the client device 160. The controller software will operate the well pump system using the automatically configured setpoints unless changes to the controller settings are made via the client device 160. If controller settings are adjusted via the client device 160, the controller software will operate using the manually adjusted settings. The controller software will perform confirmation checks to verify against improper controller settings. These setup mode checks will be performed using stored values and readings such as pre-charge pressure, cut-in pressure, cut-out pressure, flowrate, well pump horsepower, well pressure tank volume, etc. and may be used to issue an alert as well as suggested correction values for improper settings. For example, upon entering information while in setup mode, the controller may issue an alert for improper cut-in pressure, improper well pressure tank size, etc. and suggest a corrected cut-in pressure, well tank size, etc. If desired, the setup mode configuration settings can be cleared and the startup mode can be re-entered, upon issuing a hard reset via the controller 110.

In the standard mode, the controller software will operate using the settings configured during the controller startup and setup modes. The controller 110 will monitor and control the pump 120 of the well system accordingly. To conserve energy and promote cost-savings, the controller will include an off-peak power setting designed limit the well pump operation during pre-configured off-peak hours. The off-peak hours will be configured via the client device 160. By running the well pump 120 less frequently during off-peak hours, the well system will consume less electricity, saving the homeowner electricity costs.

In vacation mode, the controller software will prevent the well pump from running as to prevent unscheduled use or to protect against an assumed leak, etc. If the well pump begins to run, the controller will issue an alert and shut off the well pump. To allow for planned or expected usage during vacation mode, the controller will incorporate a bypass mode. The bypass mode can be enabled or disabled via the client device 160 to allow for scheduled events such as a running sprinkler system, etc. While in bypass mode, and to allow the expected usage to continue as scheduled, the well controller will not issue an alert or shut off the well pump 120.

In storm mode, the controller software will fill the well pressure tank to its maximum capacity to ensure that the maximum volume of usable water is stored in the well tank in the event of a power outage, construction, etc. The controller software will calculate the maximum tank 130 volume using tank model number and pressure settings obtained during setup mode of the well system. Storm mode may be entering manually via client device 160 or automatically using local weather data received through the local WiFi network. The controller software will remain in storm mode for a maximum of 48 hours or until a new mode is selected via the client device 160, whichever occurs first. After the 48 hour maximum time, the controller software will return to standard mode.

The controller software can be placed into maintenance mode to allow for scheduled maintenance of the well system. While the controller software is in maintenance mode, the well pump 120 will not be started and stopped automatically by the controller software. For example, the controller software may be placed into maintenance mode to allow for pre-charge pressure analysis, during which the well pump will remain off regardless of water demand from the system 140. The controller software may be place out of maintenance mode into another mode (e.g. standard mode) to resume non-maintenance well functions.

The controller software for the well management system may be programed to monitor for and issue alerts for various alarm conditions such as pre-charge degradation, extensive water use, well pump rapid cycle, well pump low current, well pump high current, well pump improper voltage, low run pressure, well pump running in vacation mode, storm mode deactivated, loss of WiFi connection, etc. Each alert message generated by the controller software will be time-stamped (i.e. date and time provided through WiFi network), sent to the client device 160, and logged for future reference. Alerts may also be sent to designated contractors as configured in the setup mode of the well system. The alerts may also be sent to homeowners via email with an option to contact the designated contractor in regard to the alert generated by the controller software. Further, the alerts may be sent directly to the contractor via email or through the client device 160.

The controller software may monitor for and issue alerts for pre-charge degradation. To determine pre-charge degradation, the controller software will compare the well pump run-time recorded from the first well pump run cycle while in startup mode to well pump run-times recorded in subsequent run cycles of the well pump. The well pump run-time recorded from the initial startup mode will serve as the base comparison to all subsequently recorded well pump run-times. If a subsequent well pump run-time has decreased by 50% or more from the initial recorded run-time, the controller software will issue an alert to the client device 160 (e.g. pre-charge degradation alert).

The controller software may monitor for and issue alerts for extensive water use from the well pump system 140. Upon detecting a water usage over a configured threshold, the controller software will issue an alert to the client device 160 and will shut off the well pump 120. The alert may be ignored or may be sent to the designated contractor as configured in the setup mode of the well system. If the alert is ignored, the controller software will clear the alert after a designated amount of time (e.g. 1 hour), and when the alert clears, return to automatic system control per standard mode of the controller software. While the controller software is in bypass mode, the extensive water use monitoring and alerts will be disabled to allow for scheduled or planned events (e.g. filling swimming pool).

The controller software may monitor for and issue alerts for rapid cycle of the well pump 120. The total well pump run-time will be recorded and monitored over a 24-hour period (i.e. will not rely on clock time). The controller software may issue alerts for rapid cycle based on number of well pump run cycles (i.e. one run cycle is pump off—pump on—pump off) or based on length of pump run cycle or both the number and length of pump run cycles. Upon detecting a rapid cycle, the controller software will issue an alert to the client device 160, but will continue to allow the well pump 120 to run. The alert may be ignored or may be sent to the designated contractor as configured in the setup mode of the well system. If the alert is ignored, the controller software will clear the alert after a designated amount of time (e.g. 24 hours).

The controller software may monitor for and issue alerts for low current draw from the well pump. Upon detecting a current draw under a configured threshold while the controller is attempting to run the well pump, the controller software will issue an alert to the client device 160 and will shut off the well pump 120. The alert may be ignored or may be sent to the designated contractor as configured in the setup mode of the well system. If the alert is ignored, the controller software will clear the alert after a designated amount of time (e.g. 1 hour), and when the alert clears, return to automatic system control per standard mode of the controller software.

The controller software may monitor for and issue alerts for excessive current draw from the well pump. Upon detecting a current draw over a configured threshold while the controller is attempting to run the well pump, the controller software will issue an alert to the client device 160, but will continue to allow the well pump 120 to run. The alert may be ignored or may be sent to the designated contractor as configured in the setup mode of the well system. If the alert is ignored, the controller software will clear the alert after a designated amount of time (e.g. 24 hours).

The controller software may monitor for and issue alerts for improper voltage of the well pump. Upon detecting an improper voltage, the controller software will issue an alert to the client device 160 and will shut off the well pump 120 after a designated amount of time (e.g. 2 minutes). The alert may be ignored or may be sent to the designated contractor as configured in the setup mode of the well system. If the alert is ignored, the controller software will clear the alert after a designated amount of time (e.g. 1 hour), and when the alert clears, return to automatic system control per standard mode of the controller software.

The controller software may monitor for and issue alerts for low running pressure. Upon detecting a running pressure from sensor 112 under a configured threshold (e.g. 10 PSI), the controller software will issue an alert to the client device 160 and will shut off the well pump 120. The alert may be ignored or may be sent to the designated contractor as configured in the setup mode of the well system. If the alert is ignored, the controller software will clear the alert after a designated amount of time (e.g. 24 hours), and when the alert clears, return to automatic system control per standard mode of the controller software.

The client device 160 can show useful information in regard to the well management system. Available system settings such as cut-in pressure, cut-out pressure, low current timer, off-peak hours, system serial number, well tank model number, homeowner address, contractor contact information, pre-charge pressure, and password configuration, etc. can be accessed. Further, various system statuses such as system run time, WiFi connection, run cycle count, current draw, voltage draw, resistance, well tank pressure, water volume, etc. can be viewed from the client device 160. From the client device, controller software modes may be viewed and initiated. In addition to current (i.e. not past) well system information, the controller may store past information such as job site notes, job site photos, current draw history, voltage draw history, voltage history, total system run time, etc. Information and settings available through the client device 160 may be accessed by the homeowner or the contractor associated with the well system. Contractor access is limited by the permissions set by the homeowner in regard to the well system (i.e. a contractor may have full access, limited access, or no access to the well system via client device 160).

Figure 9:
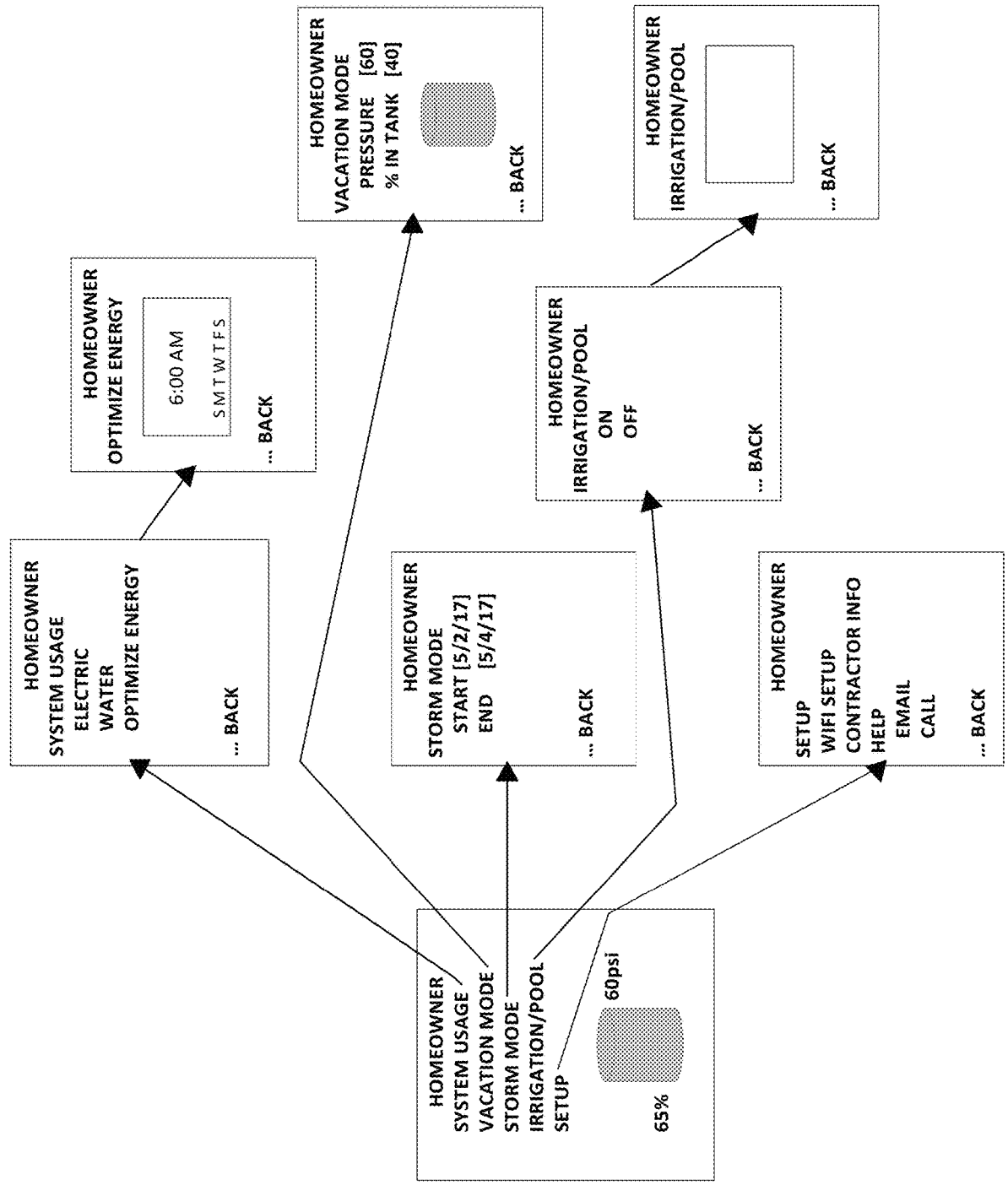
FIG. 9 are exemplary screenshots of a software application executed by a client device of a homeowner.
Figure 10:
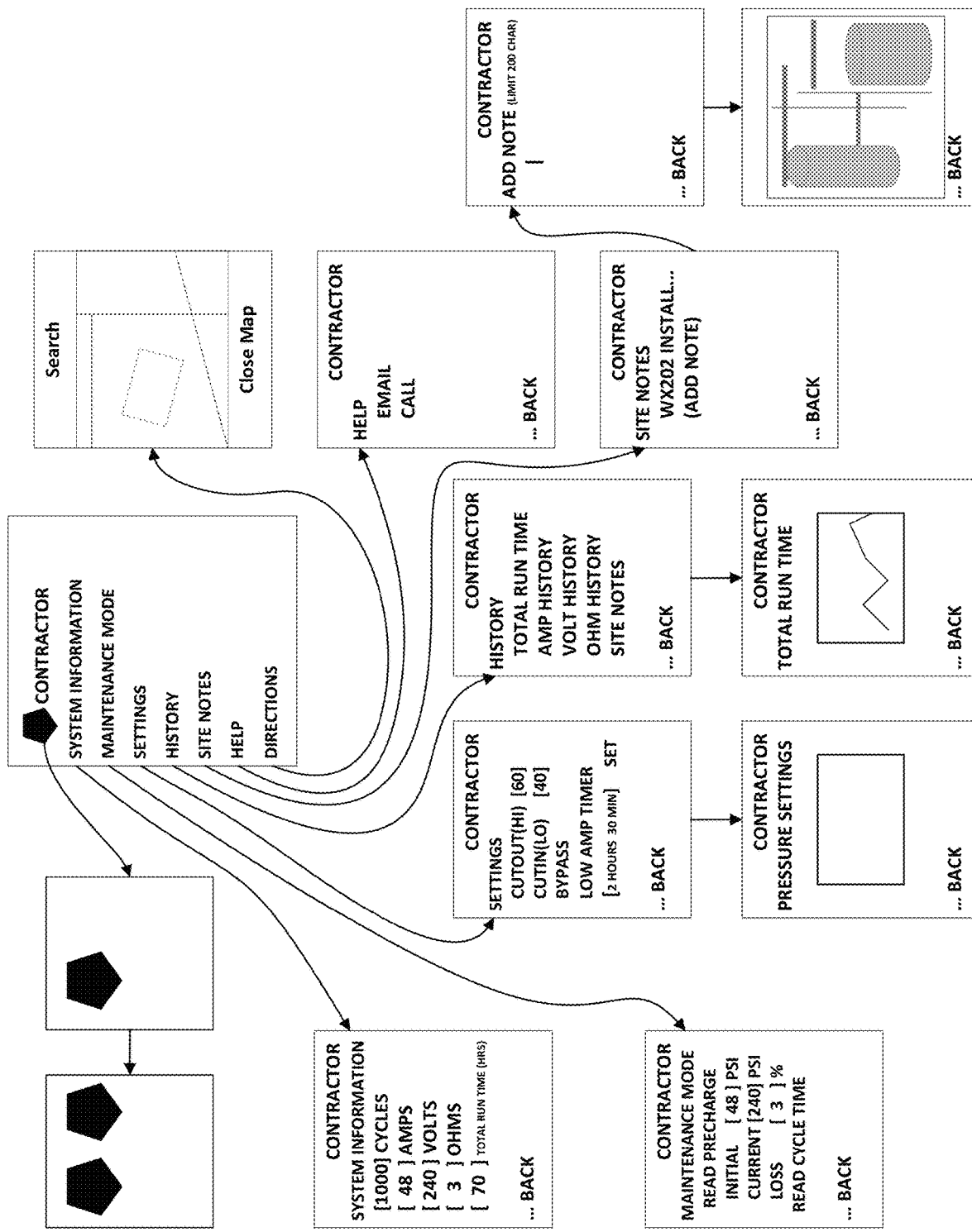
FIG. 10 are exemplary screenshots of a software application executed by a client device of a service contractor.

FIG. 9 shows an exemplary homeowner interface for a management or control application that connects to the controller via the backend end system. FIG. 10 shows an exemplary contractor interface for the management or control application.

Exemplary Computing Device

One of ordinary skill in the art can appreciate that the various embodiments of a well management system described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the well management system can be implemented based on such a cloud environment. For example, backend system 150 can reside in the cloud environment such that the computer-executable instruction implementing the functionality thereof are executed with the aggregated computing resources provided by the plurality of physical computing devices. The cloud environment provides one or more methods of access to the backend system 150, which are utilized by management application 412 on client device 160 and controller 110. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 11:
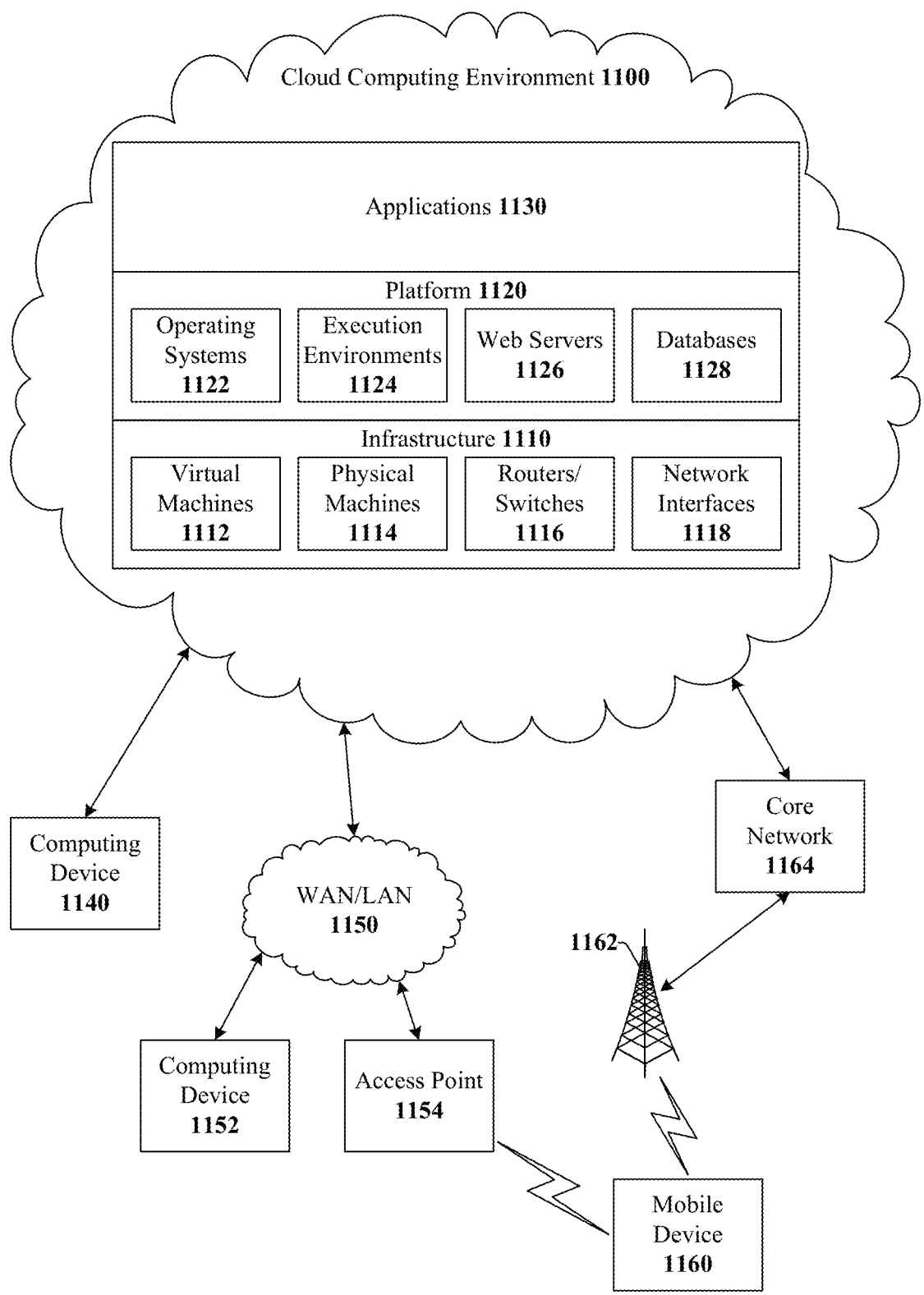
FIG. 11 is a block diagram representing an exemplary, non-limiting networked environment, including cloud or internet based, in which various embodiments described herein can be implemented.

FIG. 11 provides a schematic diagram of an exemplary networked or distributed computing environment, such as a cloud computing environment 1100. The cloud computing environment 1100 represents a collection of computing resources available, typically via the Internet, to one or more client devices. The cloud computing environment 1100 comprises various levels of abstraction: infrastructure 1110, a platform 1120, and applications 1130. Each level, from infrastructure 1110 to applications 1130 is generally implemented on top of lower levels, with infrastructure 1110 representing the lowest level.

Infrastructure 1110 generally encompasses the physical resources and components on which cloud services are deployed. For instance, infrastructure 1110 can include virtual machines 1112, physical machines 1114, routers/switches 1116, and network interfaces 1118. The network interfaces 1118 provide access to the cloud computing environment 1100, via the Internet or other network, from client devices such as computing devices 1140, 1152, 1160, etc. That is, network interfaces 1118 provide an outermost boundary of cloud computing environment 1100 and couple the cloud computing environment 1100 to other networks, the Internet, and client computing devices. Routers/switches 1116 couple the network interfaces 1118 to physical machines 1114, which are computing devices comprising computer processors, memory, mass storage devices, etc. Hardware of physical machines 1114 can be virtualized to provide virtual machines 1112. In an aspect, virtual machines 1112 can be executed on one or more physical machines 1114. That is, one physical machine 1114 can include a plurality of virtual machines 1112.

Implemented on infrastructure 1110, platform 1120 includes software that forming a foundation for applications 1130. The software forming platform 1120 includes operating systems 1122, programming or execution environments 1124, web servers 1126, and databases 1128. The software of platform 1120 can be installed on virtual machines 1112 and/or physical machines 1114.

Applications 1130 include user-facing software applications, implemented on platform 1120, that provide services to various client devices. In this regard, the backend system 150 of the well management system 100 described herein is an example application 1130. As illustrated in FIG. 11, client devices can include computing devices 1140, 1152 and mobile device 1160. Computing devices 1140, 1152 can be directly coupled to the Internet, and therefore the cloud computing environment 1100, or indirectly coupled to the Internet via a WAN/LAN 1150. The WAN/LAN 1150 can include an access point 1154 that enables wireless communications (e.g., WiFi) with mobile device 1160. In this regard, via access point 1154 and WAN/LAN 1150, mobile device 1160 can communicate wirelessly with the cloud computing environment 1100. Mobile device 1160 can also wirelessly communicate according to cellular technology such as, but not limited to, GSM, LTE, WiMAX, HSPA, etc. Accordingly, mobile device 1160 can wirelessly communicate with a base station 1162, which is coupled to a core network 1164 of a wireless communication provider. The core network 1164 includes a gateway to the Internet and, via the Internet, provides a communication path to the cloud computing environment 1100.

As mentioned above, while exemplary embodiments have been described in connection with various computing devices and network architectures, the underlying concepts may be applied to any network system and any computing device or system in which it is desirable to implement an image segmentation system.

Also, there are multiple ways to implement the same or similar functionality, e.g., an appropriate API, tool kit, driver code, operating system, control, standalone or downloadable software objects, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A controller for a well system, comprising:
   a processor;
   a component interface for operatively coupling the processor to one or more components of the well system, the one or more components including at least a well pump;
   a communication interface for enabling communication with at least one of a management system or a client device via a communication network; and
   a computer-readable storage medium storing an operational configuration, operational data, and computer-executable instructions that, when executed by the processor, cause the processor to:
      collect the operational data related to the one or more components of the well system via the component interface;
      control operation of the well pump, wherein operation of the well pump is controlled in accordance with the operational data and the operational configuration, wherein the operational configuration corresponds to one of a plurality of operational modes, the plurality of operational modes includes at least an initial startup mode, wherein, during the initial startup mode, the processor is configured to:
         activate the well pump to fill a well pressure tank;
         determine a pre-charge of an air chamber of the well pressure tank based on pressure readings from a pressure sensor; and
         establish values for a cut-in pressure and a cut-off pressure based on the pre-charge;
      transmit the operational data to at least one of the management system or the client device via the communication interface; and
      receive a configuration update, via the communication interface, from the at least one of the management system or the client device and update the operational configuration based on the configuration update.

2. The controller of claim 1, further comprising a housing that contains the processor, the communication interface, the computer-readable storage medium, and the component interface.

3. The controller of claim 2, wherein the housing further contains the pressure sensor.

4. The controller of claim 1, wherein the housing is configured for installation on a well pressure tank.

5. The controller of claim 1, wherein the pressure sensor is configured to provide a pressure reading of a fluid pressure within the well system,
   wherein the operational configuration includes pressure parameters specifying the cut-in pressure and the cut-off pressure, and
   wherein the processor is further configured to activate the well pump when the pressure sensor indicates the cut-in pressure and deactivate the well pump when the pressure sensor indicates the cut-off pressure.

6. The controller of claim 1, wherein the operational configuration includes an alarm condition; and
   wherein the processor is further configured to transmit an alarm message to at least one of the management system or the client device when the operational data satisfies the alarm condition.

7. The controller of claim 1, wherein the operational data includes electrical properties of the well pump in operation, condition of electrical supply to the well pump, cycle times of the well pump, and pressure data from the pressure sensor.

8. The controller of claim 7, wherein the processor is further configured to:
   analyze the operational data to identify an issue with the well system; and
   deviate from the operational configuration in response to identification of the issue.

9. The controller of claim 1, wherein the one or more components coupled via the component interface include a sensor configured to detect a water volume within a well pressure tank, and
   wherein the processor is further configured to include the water volume in the operational data for transmission to at least one of the management system or the client device.

10. The controller of claim 1, wherein the plurality of operational modes includes a setup mode,
    wherein, during the setup mode, the processor is configured to configure the communication interface for communication with the at least one of the client device or management system via the communication network.

11. The controller of claim 1, wherein the plurality of operational modes includes a vacation mode,
    wherein, during the vacation mode, the processor is configured to prevent operation of the well pump.

12. The controller of claim 1, wherein the plurality of operational modes includes a storm mode,
    wherein, during the storm mode, the processor is configured to adjust a cut-in pressure and a cut-off pressure for the well pump to maintain a maximum volume in the well pressure tank.

13. The controller of claim 1, wherein the plurality of operational modes includes a maintenance mode,
    wherein, during the maintenance mode, the processor is configured to prevent operation of the well pump and to determine a pre-charge of a well pressure tank.

14. A system, comprising:
    a tank for storing a fluid and for delivering the fluid under pressure to a distribution system;
    a controller to control operation of a pump to supply the fluid to one of the tank or the distribution system, wherein the controller is operatively coupled to the pump and a pressure sensor that provides a pressure reading for the system, wherein the controller is configured to control operation of the well pump in accordance with an active operational mode and based on the pressure reading and pump operational data, wherein the active operational mode is one of a plurality of modes that includes at least an initial startup mode in which the controller activates the pump to fill the tank, determines a pre-charge of an air chamber of the well pressure tank based on pressure readings from a pressure sensor, and establishes values for a cut-in pressure and a cut-off pressure based on the pre-charge;

a management system communicatively coupled to the controller via a communication network, wherein the management system is configured to receive system information from the controller and store the system information in association with an identifier corresponding to the controller; and a client device communicatively coupled to the management system and storing computer-executable instructions for a control application, wherein the control application configures the client device to receive system information from the management system, display system information to a user, and transmit control commands to the controller via the management system, the control commands include at least a command to change the active operational mode.

15. The system of claim 14, wherein the active operational mode specifies one or more actions and respective parameters from the pump operational data or respective values of the pressure reading that respectively trigger the one or more actions.

* * * * *